H. J. APPLETON.
AIR COMPRESSING APPARATUS.
APPLICATION FILED MAR. 24, 1920.
1,398,251.
Patented Nov. 29, 1921.
2 SHEETS—SHEET 1.
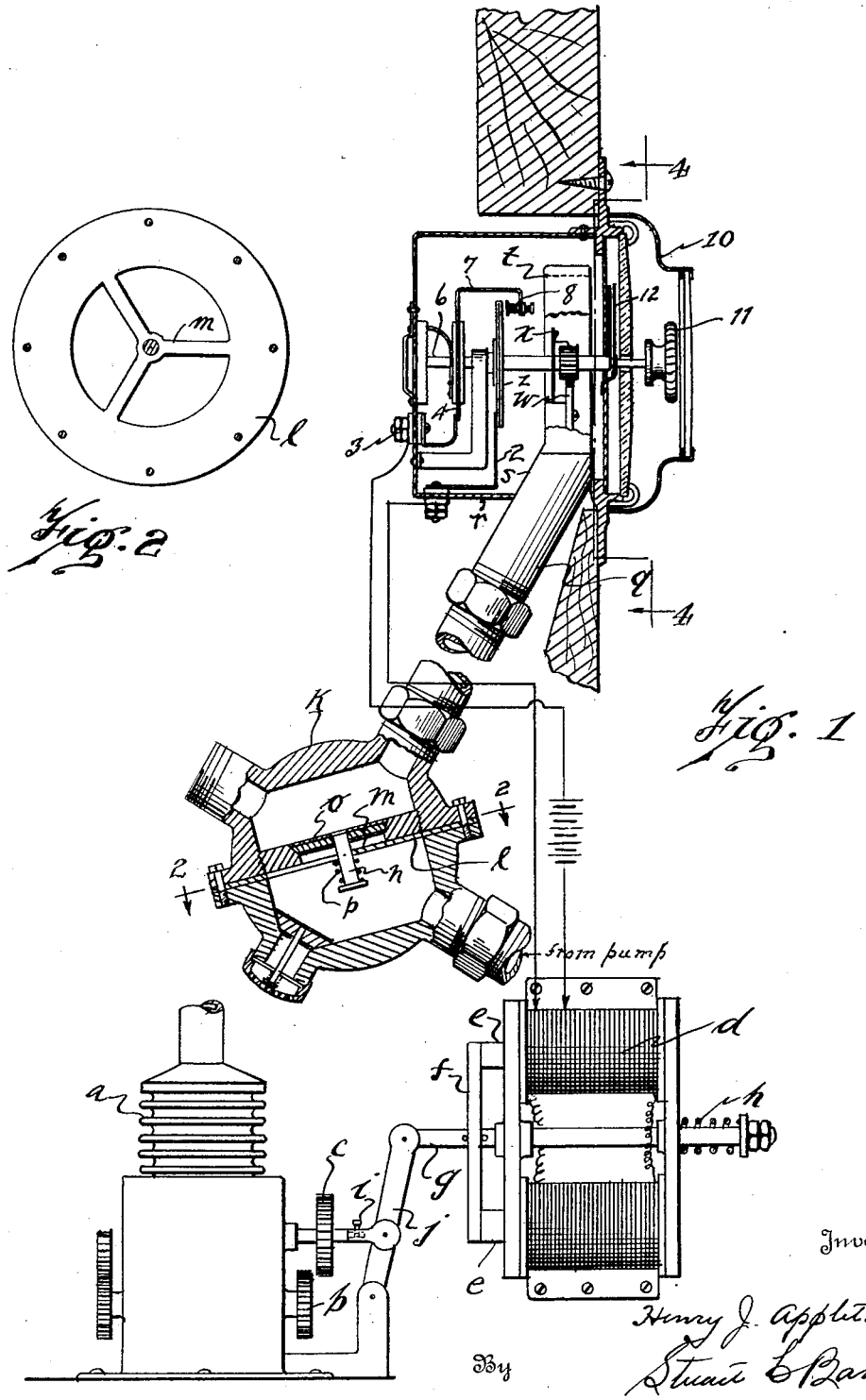

H. J. APPLETON.
AIR COMPRESSING APPARATUS.
APPLICATION FILED MAR. 24, 1920.
1,398,251.
Patented Nov. 29, 1921.
2 SHEETS—SHEET 2.
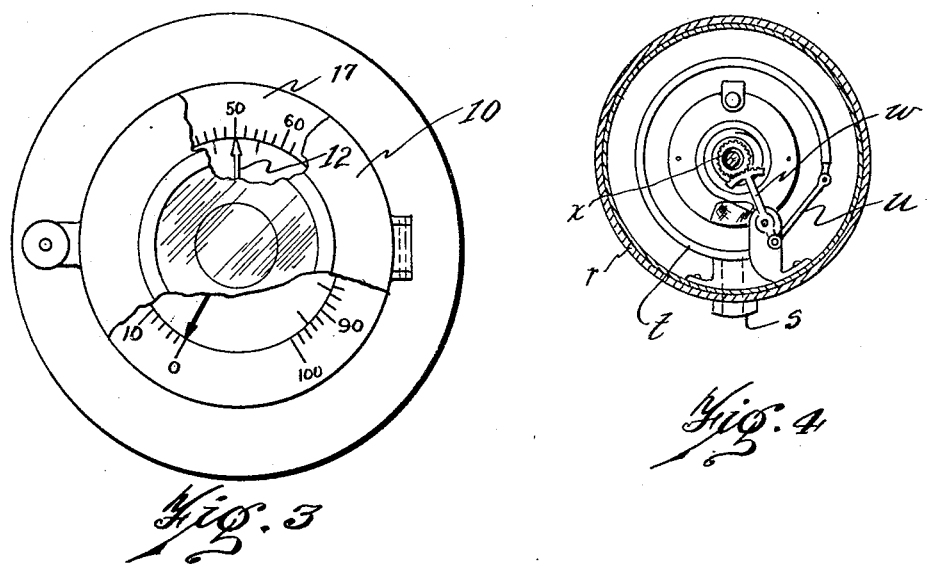
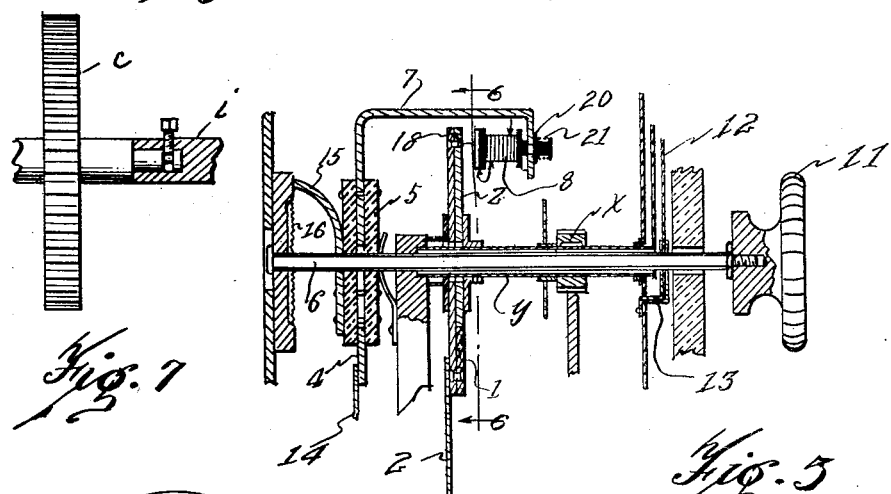
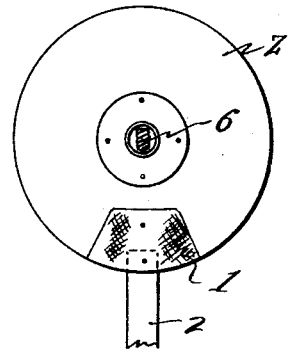
Inventor
Henry J. Appleton
By Stuart C. Barnes
Attorney

UNITED STATES PATENT OFFICE.

HENRY J. APPLETON, OF DETROIT, MICHIGAN.

AIR-COMPRESSING APPARATUS.

1,398,251.  Specification of Letters Patent.  Patented Nov. 29, 1921.

Application filed March 24, 1920. Serial No. 368,280.

*To all whom it may concern:*

Be it known that I, HENRY J. APPLETON, a citizen of the United States, residing at Detroit, in the county of Wayne and State of Michigan, have invented certain new and useful Improvements in Air-Compressing Apparatus, of which the following is a specification.

This invention relates to an automatic control for a tire pump and has for its object a control to automatically shut off the air pump when a tire has reached a predetermined inflation. The indicating devices are located on the instrument board of the car as well as the setting device and the switch that sets the pump into operation. The mechanism will be best understood both in its broad and its detailed aspect when the parts have been separately described.
In the drawings,—

Figure 1 is a vertical section through the parts on the instrument board and showing in elevation the tire pump and electric control therefor.
Fig. 2 is a section on the line 2—2 of Fig. 1 showing in elevation the gasket used between two parts of the valve chamber.

Fig. 3 is a front elevation of the parts exposed on the instrument board, a part of the cover being broken away.

Fig. 4 is a section on the line 4—4 of Fig. 1.

Fig. 5 is an enlarged cross section of the parts on the instrument board shown in Fig. 1.
Fig. 6 is a section on the line 6—6 of Fig. 5.

Fig. 7 is a detail of the gear-shifting connection.

The air pump is designated $a$ and may be connected up to the driving gear $b$ by shifting the gear $c$ into mesh therewith. This shifting is accomplished by a pair of solenoids $d$ whose plungers $e$ through the cross bar $f$ shift the rod $g$ outwardly against the tension of the spring $h$. The movement of this rod $g$ is communicated to the reciprocatable shaft $i$ by means of the lever $j$.

The remainder of the apparatus comprises parts that are mounted adjacent the instrument board, which comprise a switch for establishing a circuit through the coils of the magnet $d$ and means for automatically cutting off this switch when the pressure in the tires reaches a predetermined point. $k$ designates a valve casing comprising two castings each with a pair of nipples formed therein. The two castings are bolted together at their center with an interposed packing gasket $l$ for making an air-tight fit between the two, forming a spider $m$ to guide the stem $n$ of the check valve $o$ that is normally held to its seat by the coil spring $p$. One of the nipples has a connection with the pump as indicated by the words "From pump" in the drawing. The two nipples on the farther side of the check valve have one connection to the tire as indicated in the drawing and the other a connection with the indicating means and automatic cut-off on the instrument board. The air line $q$ leads from this valve chamber into the cylindrical housing $r$ and through a suitable fixture $s$ to the circular tubing $t$ flattened in cross section. The end of this tubing is closed and connected by a link $u$ with a toothed segment $w$ that meshes with the pinion $x$.

Now referring to Fig. 5, it will be seen that the pinion $x$ is secured to the sleeve $y$ on which is also secured the switch disk $z$. This disk is magnetic and is made up of a pair of plates of metal with a fiber insert 1. The contact spring 2 wipes the metal side of the disk so as to put the disk in circuit with the solenoids, as clearly shown in Fig. 1. The return wire from the solenoids will be seen to lead through the binding post 3 to the metal ring 4 supported by the pair of fiber disks 5 on the flattened shaft 6 which is supported within the sleeve $y$. An arm 7 forms a continuation of the metal disk 4 and carries slidably on its end a magnet 8.

When one desires to fill up his tires to a given pressure he turns back the cover 10, grasps the knurled knob 11, and turns the flattened shaft 6 which supports the setting hand 12 between two disks 13 that prevent it from moving longitudinally of the shaft. At the same time this turns the fiber disks to which the metallic ring 4 is secured, the metal ring 4 wiping the spring contact 14. This, of course, at the same time turns the arm 7 that carries the magnet 8. A bent spring 15 engages the teeth 16 of the rack to retain the ring, fiber disks, the arm, and the magnet, in any position of setting. The magnet, supporting arm, fiber disks and metal ring 4 will be broadly termed the setting element of the switch. The rotating disk $z$ with its insert 1 will be termed the rotating element of the automatic switch. The operator turns the knob 11 until the setting hand 12 reaches the point on the calibrated dial 17 which is opposite the pressure that he desires to fill his tires up to. This also, as already explained, carries the magnet 8 around to the same relative point. The operator then presses in on the knob 11. This brings the contact 18 on the end of the magnet 8 against the metal portion of the disk z. The magnet itself is supported between the fiber collars 20 and is normally projected slightly toward the disk z by means of the tractile spring 21. This gives a certain amount of spring pressure for the contact 18 against the metal disk z when the magnet is brought into contact therewith by pushing the knob 11 inward. The bent spring 15 slightly resists this movement and serves to release the magnet from the disk z when the fiber section 1 comes around opposite the magnet.

The operation will be evident. The pushing of the magnet into contact with the metal disks establishes a circuit through the disk and through the solenoids $d$ shown in Fig. 1. The solenoids immediately operate to throw the gear $c$ into mesh with the gear $b$ of the tire pump which is always running. This starts the pump working, the air is driven into the valve casing $k$, part of it goes into the tire and part of it goes into the pipe line $q$ that leads to the flat tube $t$. As air is driven into the chamber of the valve casing $k$ on the further side of the check valve $o$, of course it has to build up a pressure sufficient to open the tire valve and force additional air into the tire. When the tire valve is open the pressure in this chamber and in the pipe $q$ will be obviously the same as the pressure of the fluid in the tire. This pressure will cause the circular flat tube or air gage spring $t$ to expand as the pressure increases, thereby moving the link $u$, the segment $w$, and the pinion $x$, and thereby causing the rotating switch element or disk $z$ to rotate and to continue to rotate as the pressure expands the spring gage $t$ until such time as the fiber insert 1 comes opposite the magnet contact 18, whereupon the circuit will be broken, causing the magnet to release its hold on the disk. The spring 15 will serve to force the magnet out of engagement with the disk and the spring $h$ connected with the solenoids $d$ will pull the gear $c$ out of contact with the driving gear $b$ and thus stop the machine.

What I claim is:

1. In an automatic switch for controlling the connection or disconnection with driving means, the combination of a rotating switch element provided with a metal portion and a fiber portion, a magnet that can be set at a determined position in the path of rotation of the rotating switch element and pushed into contact with the metal portions to establish a circuit until the rotation of the switch element brings the fiber portion around and breaks the circuit, and means for driving the rotating switch element in rotation in accordance with the increase in pressure in a container.

2. In an automatic switch, the combination of a magnet provided with a contact which may be set at a determined position and may be pushed into contact with a rotating element which it grips as long as the magnet is energized, the said rotating switch element which is provided with a metal portion at times in circuit with the magnet and with a fiber portion which when rotated brings the fiber portion opposite the magnet and breaks and releases the magnet, and means for causing the air pressure to rotate the disk.

3. In an automatic electric switch, the combination of a part metal and part fiber disk driven in rotation by the rise of air pressure in a container, and a contact element in the form of a magnet that can be brought and held in engagement with the metal portion of the disk to establish a circuit therethrough and operate the electric control and which can be placed in a selectable position along the path of rotation of the rotating element, said contact member being releasable to break the circuit and release the driving means when the fiber portion of the disk comes opposite the said contact member and breaks the circuit.

4. In an electric control for disconnecting or connecting driving means, an automatic switch for operating the electric control comprising a part metal and part fiber disk, a contact member in the form of a magnet that may be set at selectable positions in the path of rotation of the disk and which may be pushed into contact with the metal portion of the disk to establish a circuit and which is released when the fiber portion of the disk comes adjacent the said contact member, and a drive for the said rotating disk including an air line and a flat circular tube that is caused to expand with the increase in air pressure and thereby through suitable connections to drive the rotating disk.

5. In an electric control for connecting or disconnecting the driving means, and an automatic switch for governing the electric control including a rotating element, a contact element that may be set at selectable positions in the point of travel of the rotating element, said rotating element being provided with a metal conducting portion and a fiber non-conducting portion, the latter of which serves to release the contact when it is rotated opposite thereof, and means for rotating the rotating element in accordance with the increase of pressure including an air gage spring that expands with increase of pressure, and operating connections with the rotating element.

6. In automatic electric switch, the combination of a part metal and part fiber disk driven in rotation by the rise of air pressure in a container, an arm that carries a slidable electric magnet on its end, which arm is fixable in selectable positions around the outside of the disk, said magnet operating as a contact element, a shaft to which the arm is attached whereby the arm may be turned in rotation by rotating the shaft and whereby the magnet may be pushed into contact with the disk by pushing in on the shaft, the said magnet operating as a contact element in an electric circuit, which circuit is broken when the fiber portion of the disk comes into contact with the magnet, and means for driving the said disk in rotation in accordance with rise in pressure in the container.

In testimony whereof I affix my signature.

HENRY J. APPLETON.